(12) United States Patent
Lee et al.

(10) Patent No.: US 10,078,486 B2
(45) Date of Patent: Sep. 18, 2018

(54) DISPLAY DEVICE AND MULTI-DISPLAY DEVICE

(71) Applicant: LG Display Co., Ltd., Seoul (KR)

(72) Inventors: WonHo Lee, Paju-si (KR); ChanHo Lee, Paju-si (KR); HyeonGon Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 26 days.

(21) Appl. No.: 15/390,300

(22) Filed: Dec. 23, 2016

(65) Prior Publication Data

US 2018/0121153 A1    May 3, 2018

(30) Foreign Application Priority Data

Oct. 31, 2016 (KR) .................. 10-2016-0142996

(51) Int. Cl.
*G06F 3/14* (2006.01)
*G09G 3/36* (2006.01)
(Continued)

(52) U.S. Cl.
CPC ...... *G06F 3/1446* (2013.01); *G02F 1/133512* (2013.01); *G02F 1/134309* (2013.01); *G09G 3/003* (2013.01); *G09G 3/3677* (2013.01); *G09G 3/3688* (2013.01); *G02F 2201/52* (2013.01); *G02F 2201/56* (2013.01); *G09G 2300/026* (2013.01); *G09G 2300/0408* (2013.01); *G09G 2300/0426* (2013.01); *G09G 2300/0452* (2013.01); *G09G 2310/0232* (2013.01); *G09G 2320/0223* (2013.01); *G09G 2320/0233* (2013.01); *G09G 2320/0686* (2013.01)

(58) Field of Classification Search
CPC .. G06F 3/1446; G09G 3/3677; G09G 3/3688; G09G 3/23; G09G 3/026; G09G 3/0452
See application file for complete search history.

(56) References Cited

U.S. PATENT DOCUMENTS 3,687,530 A    8/1972   Watanuki
5,023,725 A    6/1991   McCutchen
(Continued)

FOREIGN PATENT DOCUMENTS

CN    102213887 A    10/2011
CN    101853621 B    6/2012
(Continued)

OTHER PUBLICATIONS

Japanese First Office Action, Japanese Application No. 2016-253459, dated Nov. 7, 2017, 13 pages (with concise explanation of relevance).
(Continued)

*Primary Examiner* — Ariel Balaoing
(74) *Attorney, Agent, or Firm* — Fenwick & West LLP

(57) ABSTRACT

A display device is provided that includes: a display panel having data lines and gate lines on a substrate and pixels on the substrate; a data driver for driving the display panel; and a gate driver. The substrate may have a triangular shape, and the pixels of the display panel may be arranged in the shape of a triangle on the triangular substrate. The display device may be used to manufacture a multi-display device, and the multi-display device may display a continuous 3D image.

19 Claims, 19 Drawing Sheets

(51) Int. Cl.
  *G09G 3/00* (2006.01)
  *G02F 1/1335* (2006.01)
  *G02F 1/1343* (2006.01)

(56) References Cited

U.S. PATENT DOCUMENTS

| | | | |
|---|---|---|---|
| 5,926,153 | A | 7/1999 | Oishi et al. |
| 6,115,176 | A | 9/2000 | Nalwa |
| 7,554,640 | B2 | 6/2009 | Ono |
| 8,089,432 | B2 | 1/2012 | Ito et al. |
| 2001/0022644 | A1* | 9/2001 | Hinata .............. G02F 1/133555 349/149 |
| 2006/0077191 | A1* | 4/2006 | Ming-Daw ....... G02F 1/133351 345/204 |
| 2008/0088580 | A1* | 4/2008 | Poupyrev ............. G06F 3/0346 345/156 |
| 2008/0266210 | A1 | 10/2008 | Nonaka |
| 2008/0316379 | A1* | 12/2008 | Zuidema ............ H04N 13/0404 349/15 |
| 2009/0115933 | A1 | 5/2009 | Mimura |
| 2009/0189835 | A1 | 7/2009 | Kim et al. |
| 2010/0013853 | A1 | 1/2010 | Takatori |
| 2010/0289994 | A1* | 11/2010 | Nonaka ............. G02F 1/133514 349/108 |
| 2012/0112988 | A1 | 5/2012 | Nakanishi et al. |
| 2016/0178940 | A1 | 6/2016 | Yuan et al. |

FOREIGN PATENT DOCUMENTS

| | | |
|---|---|---|
| CN | 102929091 A | 2/2013 |
| CN | 106023820 A | 10/2016 |
| JP | S59-135427 A | 8/1984 |
| JP | S63-271203 A | 11/1988 |
| JP | H06-186575 A | 7/1994 |
| JP | H07-013160 A | 1/1995 |
| JP | H07-234408 A | 9/1995 |
| JP | H11-295717 A | 10/1999 |
| JP | 2002-221730 A | 8/2002 |
| JP | 2003-140181 A | 5/2003 |
| JP | 2005-117266 A | 4/2005 |
| JP | 2005-309052 A | 11/2005 |
| JP | 2006-106764 A | 4/2006 |
| JP | 2006-234918 A | 9/2006 |
| JP | 2006-276580 A | 10/2006 |
| JP | 2007-142387 A | 6/2007 |
| JP | 2008-216356 A | 9/2008 |
| JP | 2009-134246 A | 6/2009 |
| JP | 2009-177179 A | 8/2009 |
| JP | 2009-288709 A | 12/2009 |
| JP | 2010-060907 A | 3/2010 |
| JP | 2010-286825 A | 12/2010 |
| JP | 2014-038310 A | 2/2014 |
| JP | 2016-148751 A | 8/2016 |
| KR | 2012-0004119 A | 1/2012 |
| KR | 2014-0062259 A | 5/2014 |
| TW | 201407459 A | 2/2014 |
| TW | 201415295 A | 4/2014 |
| WO | WO 2007/013210 A1 | 2/2007 |
| WO | WO 2008/062575 A1 | 5/2008 |

OTHER PUBLICATIONS

European Partial Search Report, European Application No. 16206939.7, dated Jul. 12, 2017, 18 pages.

European Extended Search Report, European Application No. 16206939.7, dated Nov. 2, 2017, 24 pages.

Japanese Office Action, Japanese Patent Application No. 2016-253459, dated May 8, 2018, 6 pages (with concise explanation of relevance).

\* cited by examiner

20-SIDED
POLYHEDRON

80-SIDED
POLYHEDRON

180-SIDED
POLYHEDRON

320-SIDED
POLYHEDRON
(SPHERICAL SHAPE)

40-SIDED
POLYHEDRON

105-SIDED
POLYHEDRON

160-SIDED
POLYHEDRON
(HEMISPHERICAL SHAPE)

DISPLAY DEVICE AND MULTI-DISPLAY DEVICE

CROSS REFERENCE TO RELATED APPLICATION

This application claims priority from Korean Patent Application No. 10-2016-0142996, filed on Oct. 31, 2016, which is hereby incorporated by reference for all purposes as if fully set forth herein.

BACKGROUND

1. Field of Technology

Embodiments of the present disclosure relate to a display device for displaying an image and a multi-display device implemented as a polyhedron through a combination of display devices.

2. Description of the Prior Art

With the development of information society, various types of requirements for display devices to display images have increased, and various types of display devices have recently been used, such as a liquid crystal display (LCD), a plasma display panel (PDP), an organic light emitting diode display device (OLED), and the like.

In general, display devices have rectangular display panels. These general display devices may be combined to continuously display images on a large screen, but may have a limitation in implementing a polyhedron to continuously display images in three dimensions.

SUMMARY

An aspect of the present disclosure is to provide a display device used for manufacturing a multi-display device.

Another aspect of the present disclosure is to provide a multi-display device capable of continuously displaying one image in three dimensions.

In accordance with an aspect of the present disclosure, there is provided a display device that comprises: a triangular display panel including: a triangular substrate; a plurality of data lines on the triangular substrate; a plurality of gate lines on the triangular substrate; a plurality of pixels disposed in a plurality of rows on the triangular substrate; a data driver located along a first side of the triangular substrate, the data driver supplying data voltages to the plurality of data lines; and a gate driver located along the first side of the triangular substrate, the gate driver sequentially supplying gate signals to the plurality of gate lines, wherein a number of pixels in each of the plurality of rows decreases as a distance between each row and the first side of the triangular substrate increases.

In accordance with another aspect of the present disclosure, there is provided a multi-display device with four or more surfaces and the multi-display device including a plurality of display devices assembled together through a connecting member to form the multi-display device, wherein each display device comprises: a triangular display panel including: a triangular substrate; a plurality of data lines on the triangular substrate; a plurality of gate lines on the triangular substrate; a plurality of pixels disposed in a plurality of rows on the triangular substrate, the plurality of pixels arranged in a shape of a triangle on the triangular substrate; a data driver located along a first side of the triangular substrate, the data driver supplying data voltages to the plurality of data lines; and a gate driver located along the first side of the triangular substrate, the gate driver sequentially supplying gate signals to the plurality of gate lines, wherein a number of pixels in each of the plurality of rows decreases as a distance between each row and the first side of the triangular substrate increases.

According to the embodiments of the present invention, the display device may be used to manufacture a multi-display device.

In addition, according to the embodiments of the present invention, the multi-display device may continuously display one image in three dimensions.

BRIEF DESCRIPTION OF THE DRAWINGS

The above and other objects, features, and advantages of the present invention will be more apparent from the following detailed description taken in conjunction with the accompanying drawings, in which:

FIG. 5A illustrates the arrangement of a gate driver and various types of interconnection wirings that are located in the non-active area of a substrate according to one embodiment.

DETAILED DESCRIPTION

Figure 1:
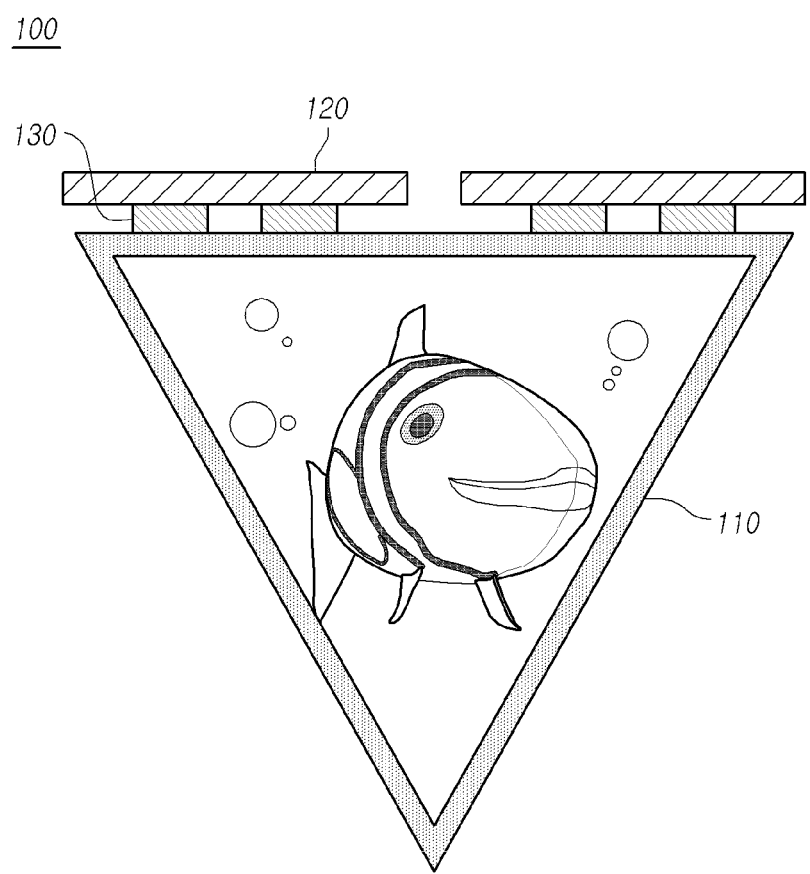
FIG. 1 is a plan view of a display device according to one embodiment.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 is a plan view of a display device according to one embodiment.

Referring to FIG. 1, the display device 100, according to the embodiment, includes a triangular display panel 110, a driver 120 for driving the display panel 110, and a connector 130 located between the display panel 110 and the driver 120. Examples of the display device 100 may include various current or upcoming display devices, such as a liquid crystal display (LCD), a plasma display panel (PDP), an organic light emitting diode (OLED) display device, and the like.

The display panel 110 may independently display an image in the shape of a triangle, or may be coupled with another display device to display a continuous image. The display panel 110 may have the shape of a triangle, such as an equilateral triangle or an isosceles triangle, but is not limited thereto.

When the display panel 110 has a triangular shape, it means that the display panel 110 has the shape of a triangle as a whole. Accordingly, three sides of the display panel 110 may be mathematically curvilinear rather than linear, or the distal ends of all or some of the three sides may be bent. Furthermore, some of vertices of the display panel 110 may be cut away or may be rounded. Hereinafter, it will be exemplified that the display panel 110 has the shape of a mathematical triangle.

The driver 120 may be located on one surface of the display panel 110 and may drive or control the display panel 110 through the connector 130. The driver 120 may be one, or a combination, of a data driver, a gate driver, a controller for controlling the data and gate drivers, and a touch driver of a general display device. While the driver 120 will be hereinafter described as including a data driver and a gate driver, the driver 120 is not limited thereto.

The connector 130 is located between the display panel 110 and the driver 120 and transmits a drive signal and/or a control signal of the driver 120 to the display panel 110. The connector 130 may connect the display panel 110 and the driver 120, for example, through tape automated bonding (TAB).

The driver 120 may be connected to a bonding pad of the display panel 110 by a chip-on-glass (COG) method, or may be directly mounted on the display panel 110. Alternatively, the driver 120 may be mounted on the display panel 110 through integration. In this case, the display device 100 may not include the separate connector 130.

Figure 2:
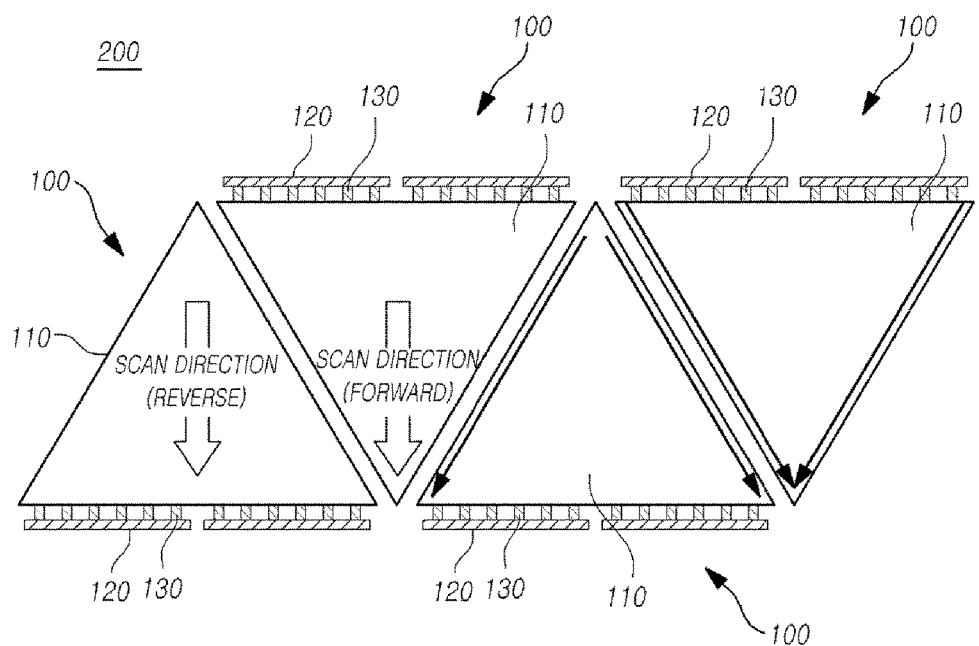
FIG. 2 is a development view of a multi-display device having a plurality of display devices assembled together, each of which is illustrated in FIG. 1 according to one embodiment.

FIG. 2 is a development view of a multi-display device having a plurality of display devices assembled together, each of which is illustrated in FIG. 1 according to one embodiment.

Referring to FIG. 2, the multi-display device 200, according one embodiment, may have the display device 100 of FIG. 1 as a unit display device, and two or more display devices 100 may be assembled together through connecting members (not illustrated). Each display device 100 may include a display panel 110, a driver 120, and a connector 130, as illustrated in FIG. 1. In this case, two adjacent display devices 100 in the multi-display device 200 may form a parallelogram, and the surfaces of the display devices 100 on which the drivers 120 are located may constitute the two bases of the parallelogram.

Figure 3A:
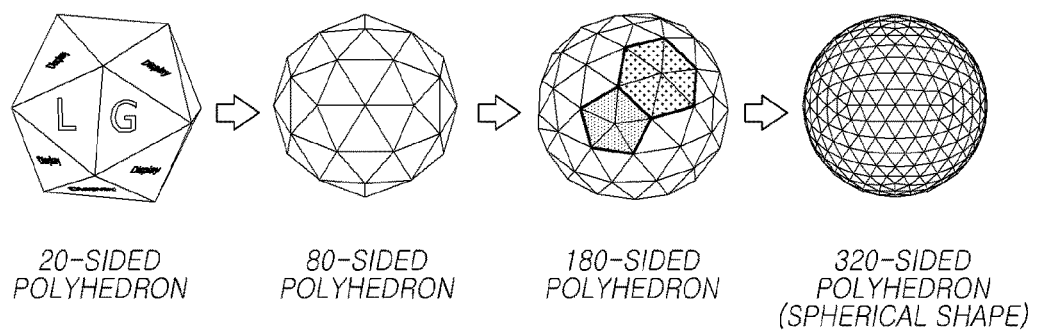
FIGS. 3A and 3B are perspective views of the multi-display device of FIG. 2, which is assembled in a polyhedron structure according to one embodiment.

The multi-display device 200, as illustrated in FIG. 3A, may constitute a polyhedron with three or more sides, which has two or more display devices 100 assembled together. The multi-display device 200 may constitute a polyhedron, which may be, for example, a 20-, 80-, 180-, 320-sided polyhedron, etc. The multi-display device 200 may have a spherical shape as a whole with an increase in the number of sides.

Figure 3B:
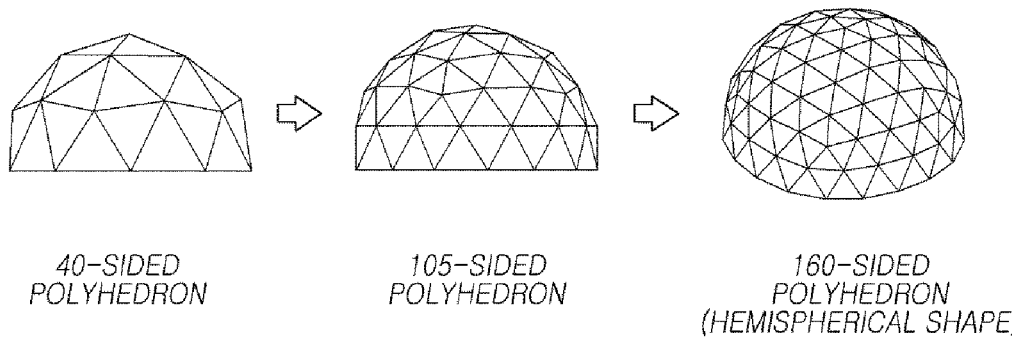

The multi-display device 200, as illustrated in FIG. 3B, may constitute a hemispherical or domed polyhedron with three or more sides, which has two or more display devices 100 assembled together. The multi-display device 200 may constitute a hemispherical or domed polyhedron, which may be, for example, a 40-, 105-, 160-sided hemispherical or domed polyhedron, etc. The multi-display device 200 may have a hemispherical shape as a whole with an increase in the number of sides.

Since the display panel 110 illustrated in FIG. 1 has a triangular shape, the degree of freedom in the manufacturing of a polyhedron may be increased, and it is possible to show images in consideration of future expandability. The display devices 100 constituting the polyhedron of the multi-display device 200 may operate in conjunction with each other to display content like a single image, or the display devices 100 may independently display images.

Hereinafter, specific embodiments of the unit display device 100 will be described in detail with reference to the accompanying drawings.

Figure 4:
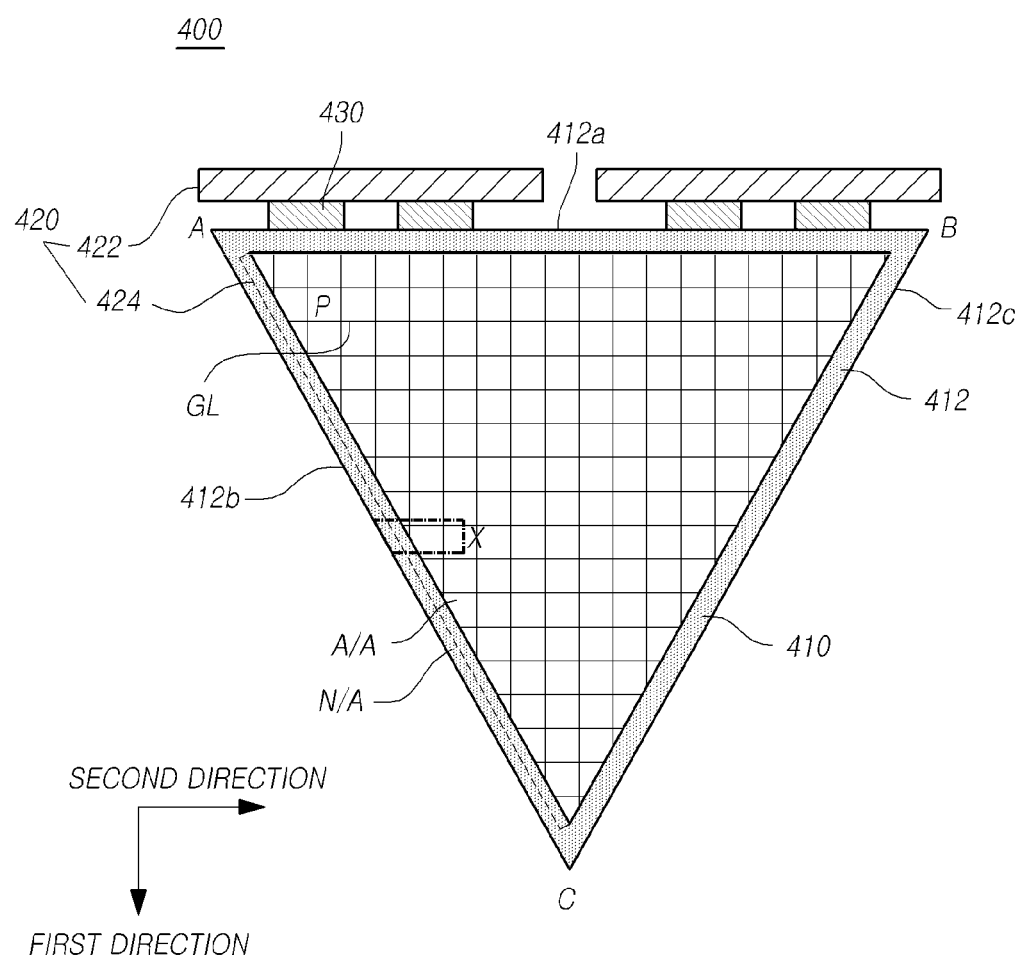
FIG. 4 is a plan view of a display device according to another embodiment.

FIG. 4 is a plan view of a display device according to another embodiment.

Referring to FIG. 4, the display device 400, according to the other embodiment, may include a display panel 410, a driver 420, and a connector 430.

The display panel 410 may include: multiple data lines DL and multiple gate lines GL arranged on a triangular substrate 412; and multiple pixels P disposed in a matrix form on the triangular substrate 412. The multiple pixels P may be arranged in the shape of a triangle on the triangular substrate 412. The triangular substrate 412 includes: three surfaces made up of first to third sides 412a, 412b, and 412c; and three vertices A, B, and C. The display panel 410 may be divided into an active area A/A for displaying an image and anon-active area N/A in which no image is displayed and elements relating to various types of signal lines or the driver 420 are arranged.

Each of the multiple pixels P arranged in the display panel 410, according to this embodiment, may basically include: a display element (such as an organic light emitting diode (OLED) or liquid crystal cell); a driving transistor (DRT) for driving the display element; and a circuit element (such as a storage capacitor, etc.).

The types and number of circuit elements constituting each pixel may be diversely determined according to functions to be provided, design methods, and the like.

The driver 420 may include: a data driver 422 that drives the multiple data lines DL by supplying data voltages to the multiple data lines DL; and a gate driver 424 that sequentially drives the multiple gate lines by sequentially supplying gate signals to the multiple gate lines.

The data driver 422 may be connected to the display panel 410 by a tape automated bonding (TAB) method while being mounted on a data tape carrier package (TCP), or may be mounted on the display panel 410 by a chip-on-glass (COG) method. Hereinafter, it will be exemplified that the data driver 422 is supplied with control signals and driving voltages input from the outside through signal lines formed on a printed circuit board (PCB) connected to a TCP and is connected to the signal lines.

The gate driver 424 may be connected to a bonding pad of the display panel 410 by a tape automated bonding (TAB) method or a chip on glass (COG) method, or may be implemented in a gate in panel (GIP) type and directly disposed on the display panel 410. In some cases, the gate driver 424 may also be integrated into the display panel 410.

Hereinafter, the gate driver 424 will be described as being implemented in a multi-gate in panel (GIP) type and directly disposed on the display panel 410. The gate driver 424 may sequentially supply gate signals from multiple gate-in-panels GIP through the multiple gate lines GL arranged on the display panel 410.

The gate driver 424 may supply the gate signals in a forward or reverse direction through the multiple gate lines GL. In this case, the forward supply may mean that the gate signals are supplied to the gate lines GL close to the first side 412a and then to the gate lines GL away from the first side 412a, as illustrated in FIG. 2. The reverse supply may mean that the gate signals are supplied to the gate lines GL away from the first side 412a and then to the gate lines GL close to the first side 412a, as illustrated in FIG. 2.

Accordingly, in a multi-display device 200 that includes the display device 400 illustrated in FIG. 4 as a unit display device, two triangular display devices 400 arranged in opposite directions may sequentially supply gate signals in reverse and forward directions, respectively, so that the multi-display device 200 may sequentially supply the gate signals in the same direction on the whole. In the multi-display device 200, the two triangular display devices 400 arranged in the opposite directions may sequentially supply gate signals in the same direction (that is, in the same reverse or forward direction) so that the multi-display device 200 may sequentially supply the gate signals in different directions for the respective unit display devices 400.

The multiple data lines DL are arranged in a first direction from the first side 412a of the triangular substrate 412. In other words, the multiple data lines DL are arranged in the first direction from the first side 412a of the triangular substrate 412 to the second and third sides 412b and 412c of the substrate 412. In this case, the lengths of the multiple data lines DL may gradually increase and then decrease again from one end A to the other end B of the first side 412a of the substrate 412. In other words, the data lines DL on the central portion of the substrate 412 may have the largest lengths, and the data lines DL on opposite outer peripheral portions of the substrate 412 may have the smallest lengths. Accordingly, the data lines DL may have gradually decreasing lengths from the central portion toward the opposite outer peripheral portions of the substrate.

The multiple gate lines GL are arranged between the second and third sides 412b and 412c of the triangular substrate 412 in a second direction, and the lengths of the multiple gate lines GL gradually decrease from one end A to the other end C of the second side 412b of the substrate 412.

As illustrated in FIG. 4, the pixels P are disposed in the areas where the multiple data lines DL arranged in the first direction and the multiple gate lines GL arranged in the second direction cross each other. The pixels P in the active area A/A of the display panel 410 that are adjacent to the first side 412a of the substrate 412, at which the data driver 422 is disposed, are arranged parallel to the data driver 422. The number of pixels P arranged in the active area A/A may gradually decrease away from the data driver 422 in proportion to the lengths of the gate lines that gradually decrease from one end A to the other end C of the second side 412b of the substrate 412.

The multiple data lines DL and the multiple gate lines GL cross each other to form a triangular matrix as a whole, and the pixels P are disposed in the areas where the multiple data lines DL and the multiple gate lines GL cross each other. Accordingly, the multiple pixels P may be arranged in the shape of a triangle on the triangular substrate 412. When the multiple pixels P are arranged in the shape of a triangle on the triangular substrate 412, it means that the pixels P do not form a mathematically complete triangle, but has the shape of a triangle as a whole.

Figure 5A:
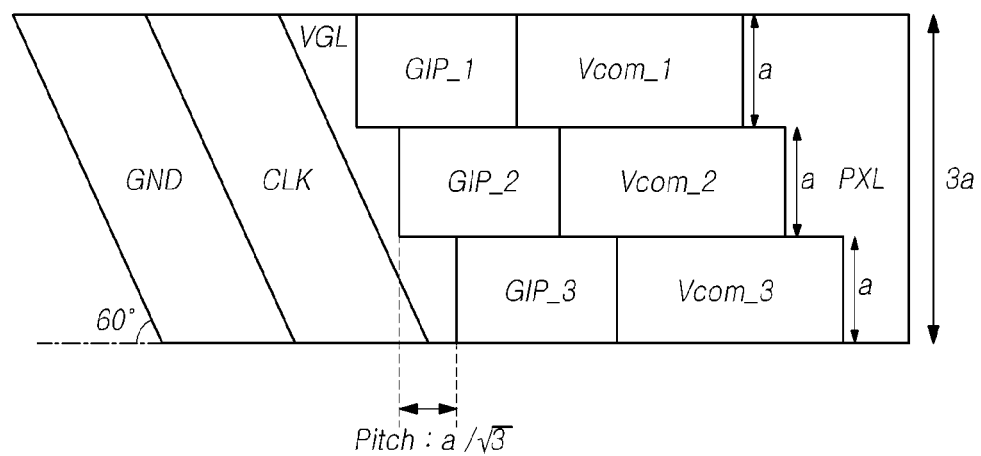
FIG. 5A is a detailed view of the portion X of FIG. 4, where
Figure 5B:
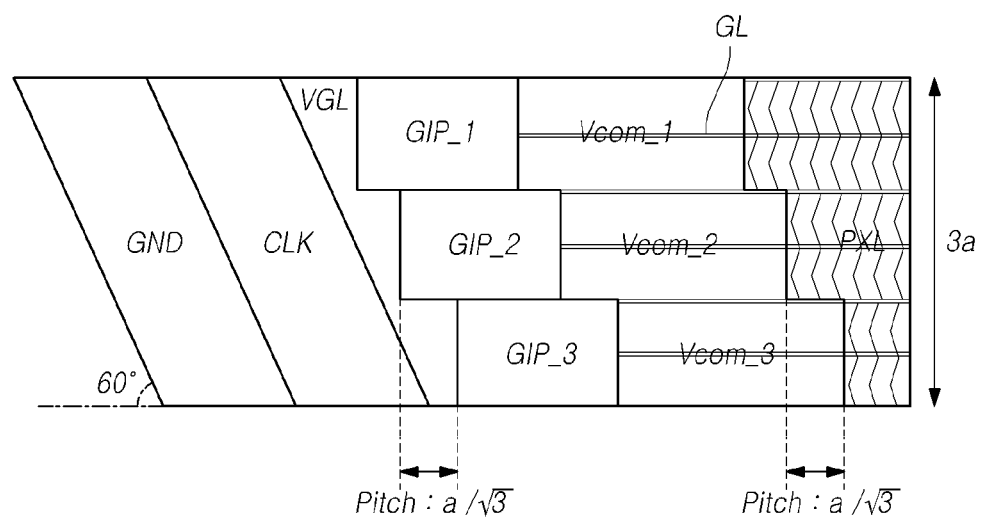
FIG. 5B is a detailed view illustrating the arrangement of GIPs and pixels of FIG. 5A according to one embodiment.

FIG. 5A is a detailed view of the portion X of FIG. 4, where FIG. 5A illustrates the arrangement of the gate driver and various types of interconnection wirings that are located in the non-active area of the substrate according to one embodiment. FIG. 5B is a detailed view illustrating the arrangement of the GIPs and pixels of FIG. 5A according to one embodiment.

Referring to FIGS. 5A and 5B, the gate driver 424 may include multiple gate-in-panels GIP arranged in the non-active area N/A of the display panel 410. The multiple gate-in-panels GIP may be arranged in the non-active area N/A so as to be parallel to one of the second and third sides 412b and 412c of the substrate 412.

Alternatively, the multiple gate-in-panels GIP may also be arranged in the non-active area N/A so as to be parallel to both the second side 412b and the third side 412c of the substrate 412. In other words, gate-in-panels GIP may be disposed on opposite sides of each gate line GL, respectively, and one or both of the gate-in-panels GIP may supply a gate signal through the gate line GL.

A ground wiring GND, a clock wiring CLK, and a gate voltage supply line VGL may be disposed between the multiple gate-in-panels GIP and the second side 412b of the substrate 412, and common wirings VCOM may be disposed between the gate-in-panels GIP and the pixels in the active area A/A. However, the arrangement of these wirings may be diversely modified. Likewise to the multiple gate-in-panels GIP, the ground wiring GND, the clock wiring CLK, and the common wirings VCOM may also be obliquely disposed. The oblique arrangement of the ground wiring GND, the clock wiring CLK, the gate voltage supply line VGL, the common wirings VCOM, and the multiple gate-in-panels GIP may be determined according to the triangular shape of the substrate 412. For example, in a case where the substrate 412 has the shape of an equilateral triangle, the ground wiring GND, the clock wiring CLK, the gate voltage supply line VGL, the common wirings VCOM, and the multiple gate-in-panels GIP may be obliquely disposed parallel to the second or third side 412b or 412c of the substrate 412.

In a case where the multiple gate-in-panels GIP have a height of a, and the substrate 412 has the shape of an equilateral triangle, the multiple gate-in-panels GIP may be obliquely disposed in the direction from one end A to the other end C of the second side 412b of the substrate 412 with a pitch of a/b (a and b are real numbers greater than 0) inward from the second side 412b of the substrate 412. In a case where the multiple gate-in-panels GIP are arranged parallel to the third side 412c of the substrate 412, the multiple gate-in-panels GIP may be obliquely disposed in the direction from one end B to the other end C of the third side 412c of the substrate 412 with a pitch of a/b inward from the third side 412c of the substrate 412. In this case, b may be determined according to the triangular shape of the substrate 412.

For example, in a case where the substrate 412 has the shape of an equilateral triangle, and the ground wiring GND, the clock wiring CLK, the common wirings VCOM, and the multiple gate-in-panels GIP are obliquely disposed with an angle of 60 degrees relative to the first side 412a, the multiple gate-in-panels GIP may be obliquely disposed in the direction from one end B to the other end C of the third side 412c of the substrate 412, for example, with a pitch of inward from the third side 412c of the substrate 412, but is not limited thereto.

As illustrated in FIG. 5B, one gate line GL may be used to simultaneously supply gate signals for two pixels P located on opposite sides thereof. In this case, the height a of the gate-in-panels GIP may be the same, or substantially the same, as the width of the two pixels located on the opposite sides of the gate line. Meanwhile, in a case where a gate signal is supplied to one pixel P through one gate line, the height a of the gate-in-panels GIP may be the same, or substantially the same, as the width of the pixel P.

When one gate line is used to supply gate signals for two pixels P located on opposite sides thereof, three pixels in the second direction (that is, 2×3 pixels (a total of 6 pixels)) may be obliquely disposed toward the interior of the substrate 412 with the same pitch as that of the multiple gate-in-panels GIP mentioned above, or with a pitch that is not the same as that of the multiple gate-in-panels GIP.

Figure 6A:
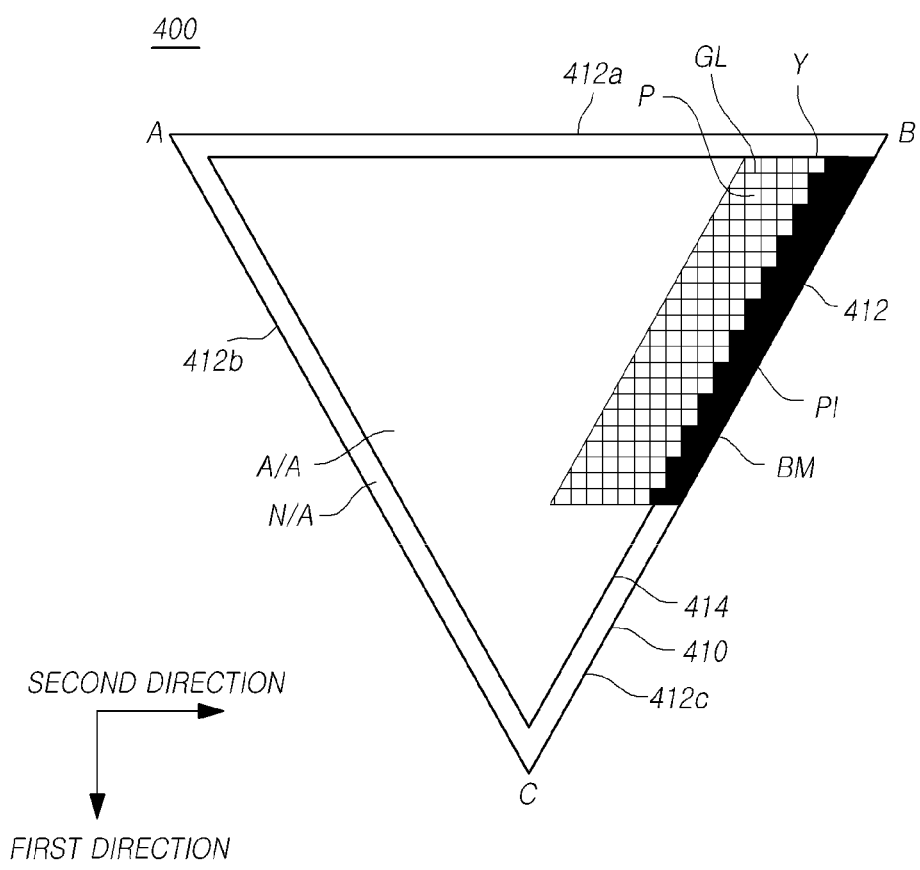
FIGS. 6A to 6C are plan views illustrating one embodiment of the arrangement of a black matrix included in a liquid crystal display device when the display device of FIG. 4 is a liquid crystal display device according to one embodiment.
Figure 6B:
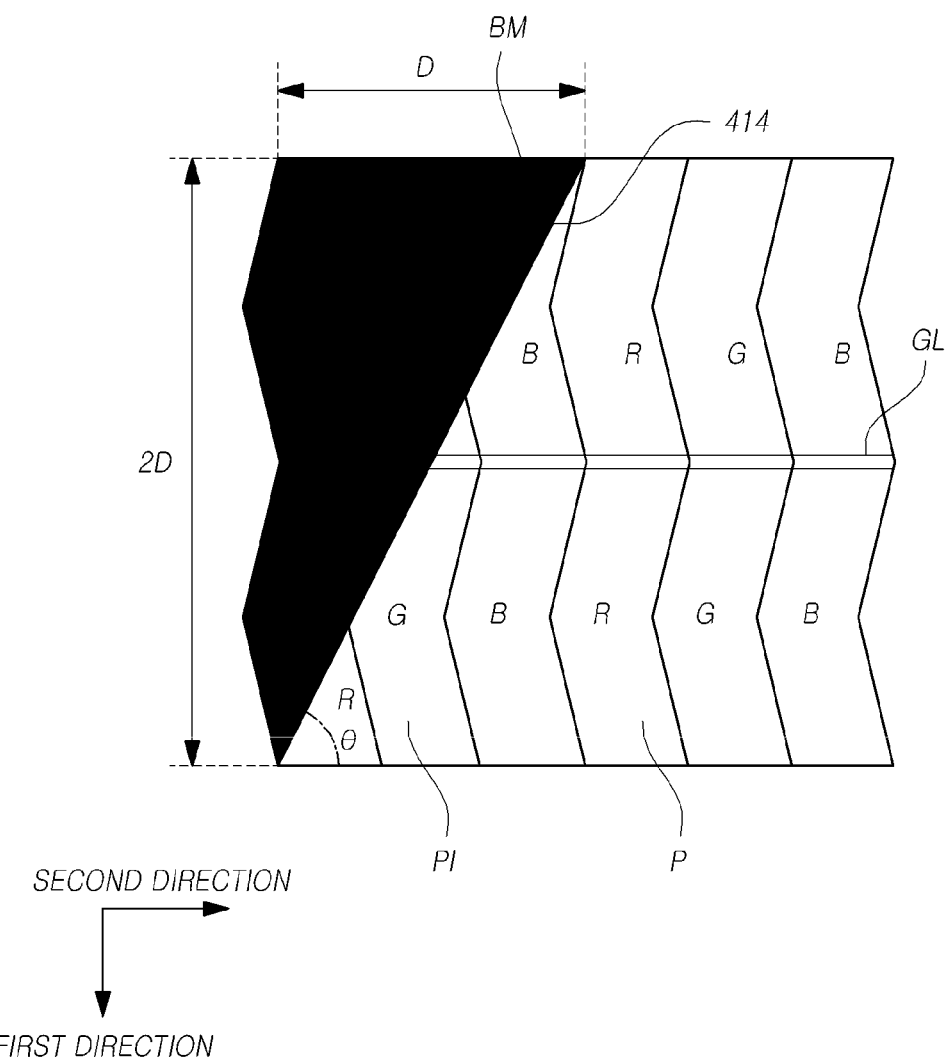
Figure 6C:
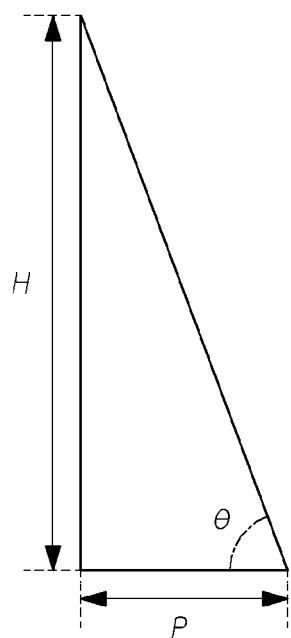

FIGS. 6A to 6C are plan views illustrating the arrangement of a black matrix included in a liquid crystal display device when the display device of FIG. 4 is a liquid crystal display device according to one embodiment. In FIG. 6A, only a part Y of the active and non-active areas is illustrated in detail, and other parts are omitted.

Referring to FIG. 6A, in a case where the display device 400 described above with reference to FIG. 4 is a liquid crystal display device, the display device 400 may further include a black matrix BM that is disposed on another substrate (not illustrated) facing the substrate 410 to correspond the non-active area N/A and a driving area in which thin film transistors (TFTs) are disposed in the active area A/A to drive the data lines DL, the gate lines GL, and the pixels P. The black matrix BM may cover the non-active area N/A and the driving area of the active area A/A.

Among the multiple pixels P disposed, as described above, in the areas in which the multiple data lines DL directed in the first direction and the multiple gate lines GL directed in the second direction cross each other, pixels PI located at the boundary 414 between the triangular active area A/A and the non-active area N/A may each cover a part of the active area A/A and a part of the non-active area N/A.

In particular, when the pixels PI located at the boundary 414 between the active area A/A and the non-active area N/A have the same pixel structure as that of the pixels P located in the active area A/A, some pixels PI are divided by the boundary 414 between the active area A/A and the non-active area N/A.

As illustrated in FIG. 6A, the black matrix BM may have a structure in which the black matrix BM covers all the pixels PI located at the boundary 414. In this case, the black matrix BM may have an outer periphery that follows the shapes of the active areas A/A of the pixels PI that are divided by the boundary 414.

As illustrated in FIG. 6B, the black matrix BM may extend from the non-active area N/A to the boundary 414 between the active area A/A and the non-active area N/A. In this case, even though the pixels PI located at the boundary 414 are divided by the boundary 414 between the active area A/A and the non-active area N/A, the black matrix BM may have a structure in which the black matrix BM only covers the portions that are included in the pixels PI located at the boundary 414 and are located in the non-active area N/A.

In other words, among the multiple pixels P, two or more pixels PI located in the outermost positions so as to be adjacent to the second side 412b of the substrate 412 may be obliquely disposed inside the second side 412b of the substrate 412. In addition, among the multiple pixels P, two or more pixels PI located in the outermost positions so as to be adjacent to the third side 412c of the substrate 412 may be obliquely disposed inside the third side 412c of the substrate 412.

In this case, the black matrix BM may obliquely cover a part of each of the pixels PI located in the outermost positions so as to be adjacent to the second and third sides 412b and 412c of the substrate 412. Accordingly, the boundary 414 that distinguishes between the active area A/A and the non-active area N/A agrees with the inclined line of the black matrix BM. While it will be exemplified that the boundary 414 that distinguishes between the active area A/A and the non-active area N/A agrees with the inclined line of the black matrix BM, the boundary 414 may not agree with the inclined line of the black matrix BM.

Suppose three pixels P have a width of P in the first direction and two pixels P located on opposite sides of one gate line have a height of H in the second direction, as illustrated in FIG. 6C. In this case, the angle θ of the inclined line of the black matrix BM, which covers a part of each pixel PI, may be an arctangent (HIP) with respect to the first side 412a. When the width P of the three pixels P in the first direction is equal to D, the height H of the two pixels P located on the opposite sides of the gate line may be smaller than or equal to 2D. Accordingly, the angle θ of the inclined line of the black matrix BM, which covers a part of each pixel PI, may be less than or equal to 63.4 because the angle is an arctangent (HIP) with respect to the first side 412a For example, in a case where the substrate 412 has the shape of an equilateral triangle, the angle θ of the inclined line of the black matrix BM may be 60 degrees with respect to the first side 412a of the substrate 412, but is not limited thereto.

Since the black matrix BM is obliquely disposed as described above, a step pattern may not be recognized at the boundary 414 between the active area A/A and the non-active area N/A.

Figure 7A:
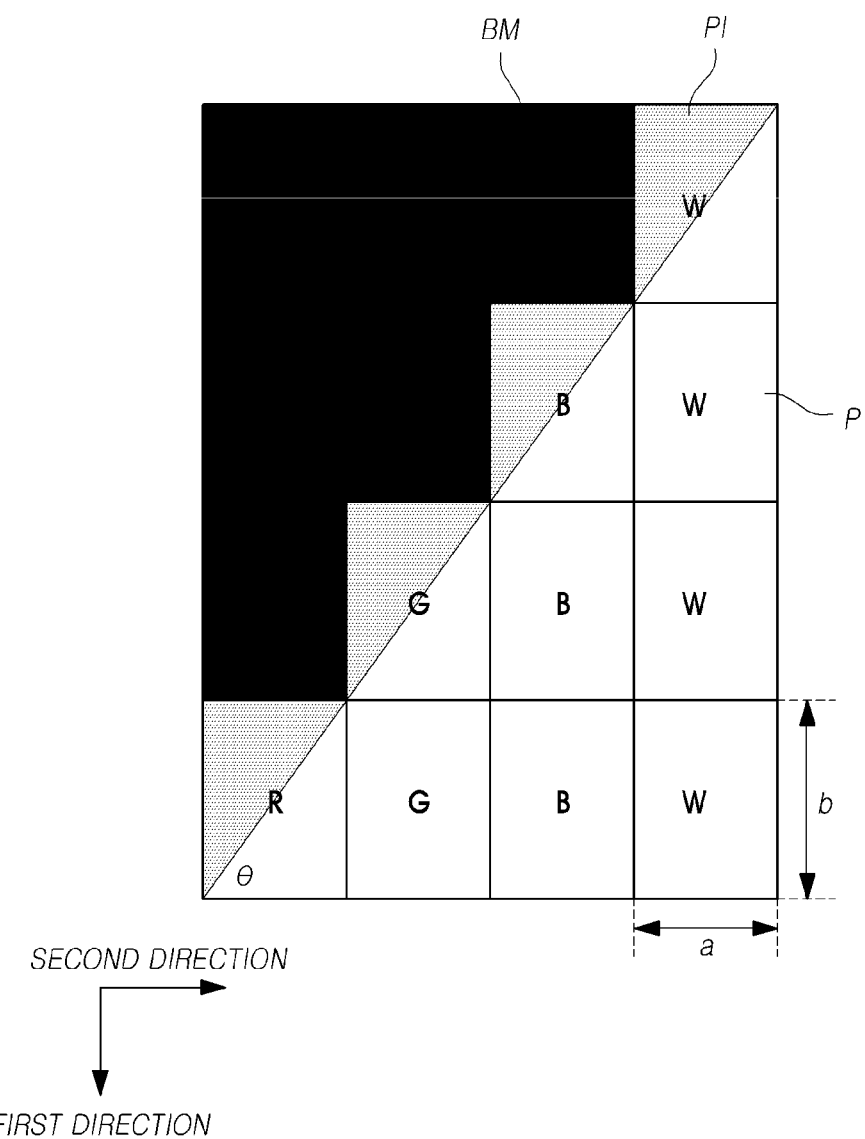
FIGS. 7A and 7B are plan views illustrating another embodiment of the arrangement of a black matrix included in a liquid crystal display device when the display device of FIG. 4 is a liquid crystal display device according to one embodiment.
Figure 7B:
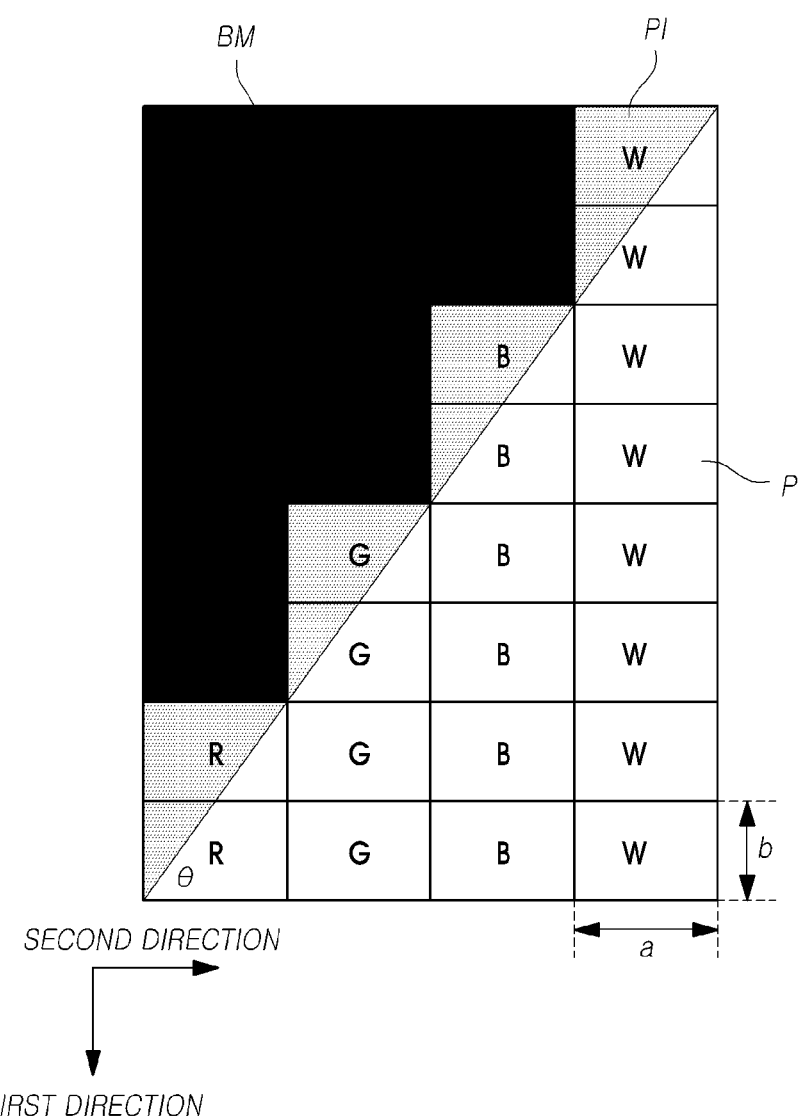

FIGS. 7A and 7B are plan views illustrating another embodiment of the arrangement of a black matrix included in a liquid crystal display device when the display device of FIG. 4 is a liquid crystal display device.

Referring to FIGS. 7A and 7B, regarding the pixels PI located at the boundary 414, the inclined line of the black matrix BM (that is, the boundary 414 between the active area A/A and the non-active area N/A) may be parallel to the diagonal line that connects vertices of one or more pixels PI located in the outermost positions so as to be adjacent to the second or third side 412b or 412c of the substrate 412.

For example, as illustrated in FIG. 7A, the inclined line of the black matrix BM may be parallel to the diagonal line that connects vertices of one pixel PI located in the outermost position so as to be adjacent to the second or third side 412b or 412c of the substrate 412. For instance, the inclined line of the black matrix BM may be identical to the diagonal line that connects the vertices of the pixel PI located in the outermost position so as to be adjacent to the second or third side 412b or 412c of the substrate 412. Accordingly, the black matrix BM may cover one half of the pixel PI located in the outermost position so as to be adjacent to the second or third side 412b or 412c of the substrate 412.

In another example, as illustrated in FIG. 7B, the inclined line of the black matrix BM may be parallel to the diagonal line that connects vertices of two pixels PI located in the outermost positions so as to be adjacent to the second or third side 412b or 412c of the substrate 412. For instance, the inclined line of the black matrix BM may be identical to the diagonal line that connects the vertices of the two pixels PI located in the outermost positions so as to be adjacent to the second or third side 412b or 412c of the substrate 412. Accordingly, the black matrix BM may cover one half of the two pixels PI located in the outermost positions so as to be adjacent to the second or third side 412b or 412c of the substrate 412.

Although it has been described in the aforementioned examples that the inclined line of the black matrix BM is parallel to the diagonal line that connects the vertices of one or two pixels PI located in the outermost positions so as to be adjacent to the second or third side 412b or 412c of the substrate 412, the inclined line of the black matrix BM may be parallel to the diagonal line that connects vertices of three or more pixels PI located in the outermost positions so as to be adjacent to the second or third side 412b or 412c of the substrate 412. In the same way, the inclined line of the black matrix BM may be identical to the diagonal line that connects the vertices of the three or more pixels PI located in the outermost positions so as to be adjacent to the second or third side 412b or 412c of the substrate 412. Accordingly, the black matrix BM may cover one half of the three or more pixels PI located in the outermost positions so as to be adjacent to the second or third side 412b or 412c of the substrate 412.

In the case where the inclined line of the black matrix BM passes through the vertices of the pixels P and the substrate 412 has the shape of a triangle, as illustrated in FIGS. 7A and 7B, the aspect ratio of the pixels may be specified. That is, the aspect ratio of the pixels may be determined according to the shape of the triangle. For example, in a case where the substrate 412 has the shape of an equilateral triangle, the ratio of the length b in the second direction to the length a in the first direction may be 1: $\sqrt{3}/n$ for each of the pixels located in the outermost positions so as to be adjacent to the second and third sides 412b and 412c of the substrate 412 (n is the number of minimum outermost pixels, the vertices of which the inclined line of the black matrix BM passes through), but is not limited thereto.

For example, when the number of minimum outermost pixels, the vertices of which the inclined line of the black matrix BM passes through, is one as illustrated in FIG. 7A, n=1, and when the number of minimum outermost pixels, the vertices of which the inclined line of the black matrix BM passes through, is two as illustrated in FIG. 7B, n=2.

Since the angle of the inclined line of the black matrix BM is adjusted as described above, a step pattern may not be recognized at the boundary 414 between the active area A/A and the non-active area N/A.

Figure 8:
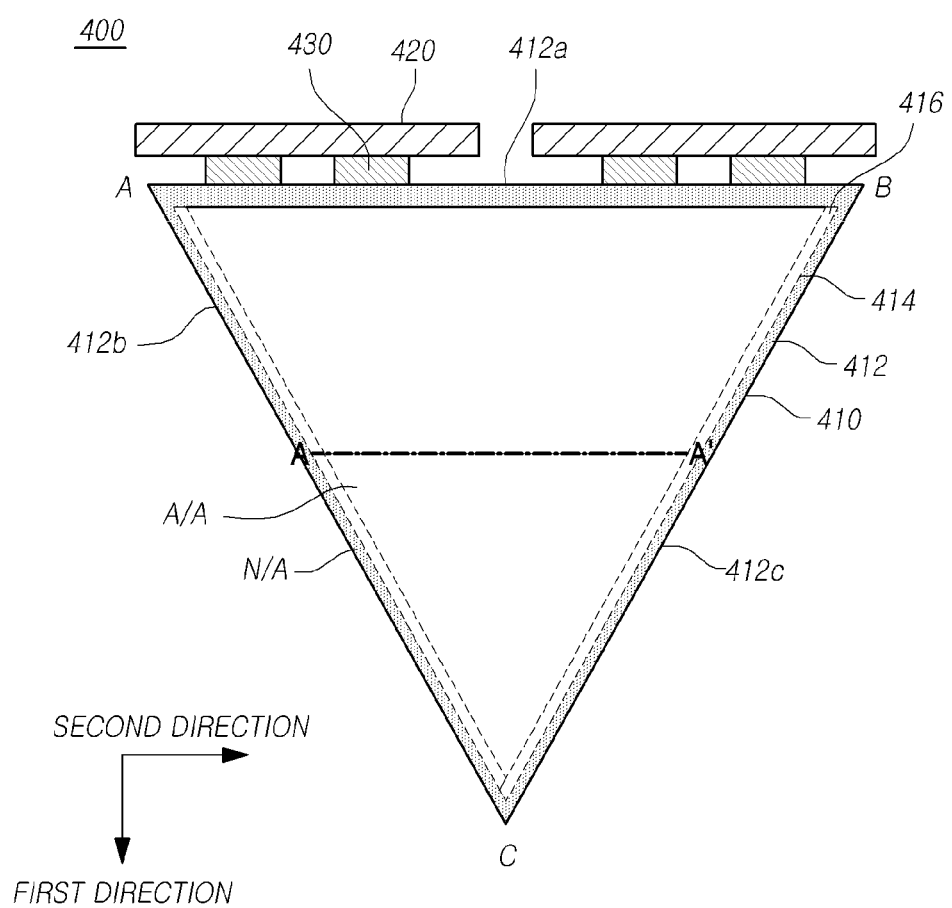
FIG. 8 illustrates image processing of diagonal pixels located at the boundary between an active area A/A and a non-active area N/A according to one embodiment.
Figure 9:
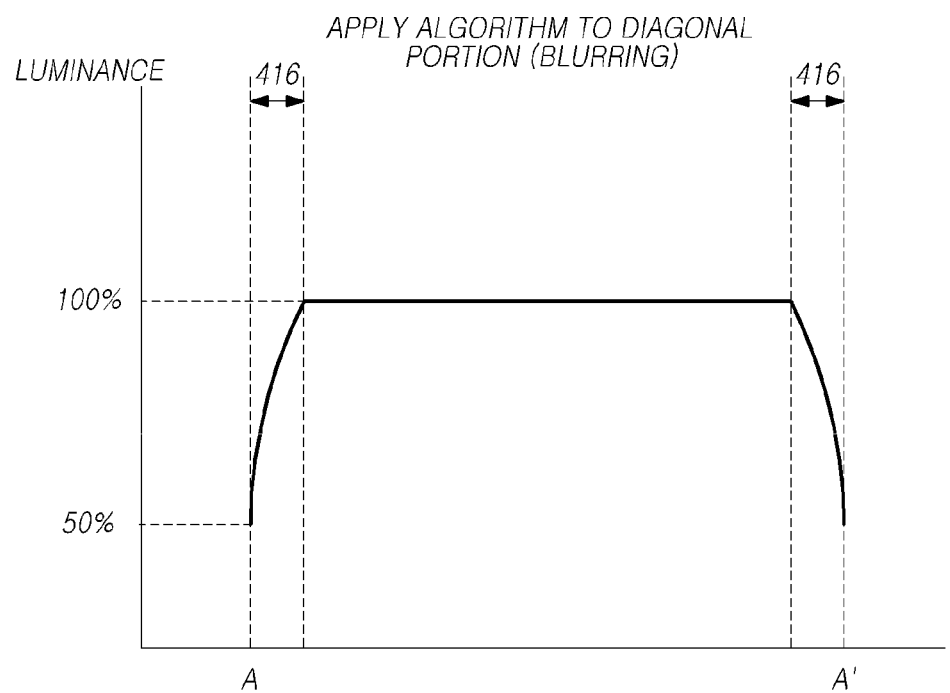
FIG. 9 illustrates relative luminance of pixels on central and diagonal portions according to one embodiment.

FIG. 8 illustrates image processing (blurring) of pixels P on a boundary portion 416 located in the active area A/A of the display panel 410 illustrated in FIG. 4 and located at the boundary between the active area A/A and the non-active area N/A in order to prevent a step pattern from being recognized at the boundary 414 between an active area A/A and a non-active area N/A. For example, the pixels P on the boundary portion 416 may have relatively low luminance as illustrated in FIG. 9.

Specifically, the pixels P located on the boundary portion 416 adjacent to the second and third sides 412b and 412c of the substrate 412 may have lower luminance than that of the pixels P located on the central portion of the substrate 412. For example, the luminance of the pixels P located on the boundary portion 416 adjacent to the second and third sides 412b and 412c of the substrate 412 may decrease gradually or in a stepwise manner with an approach to the outermost pixel P. For example, assuming that the pixels P located on the central portion of the substrate 412 has luminance of 100%, the pixels P located on the boundary portion 416 adjacent to the second and third sides 412b and 412c of the substrate 412 may have, for example, luminance of 50%, but may have any value lower than 100% without being limited thereto.

In this case, the number of pixels P disposed on the boundary portion 416, a luminance reduction rate, and the luminance of the outermost pixel may be properly selected according to various situations of the display device 400.

Figure 10:
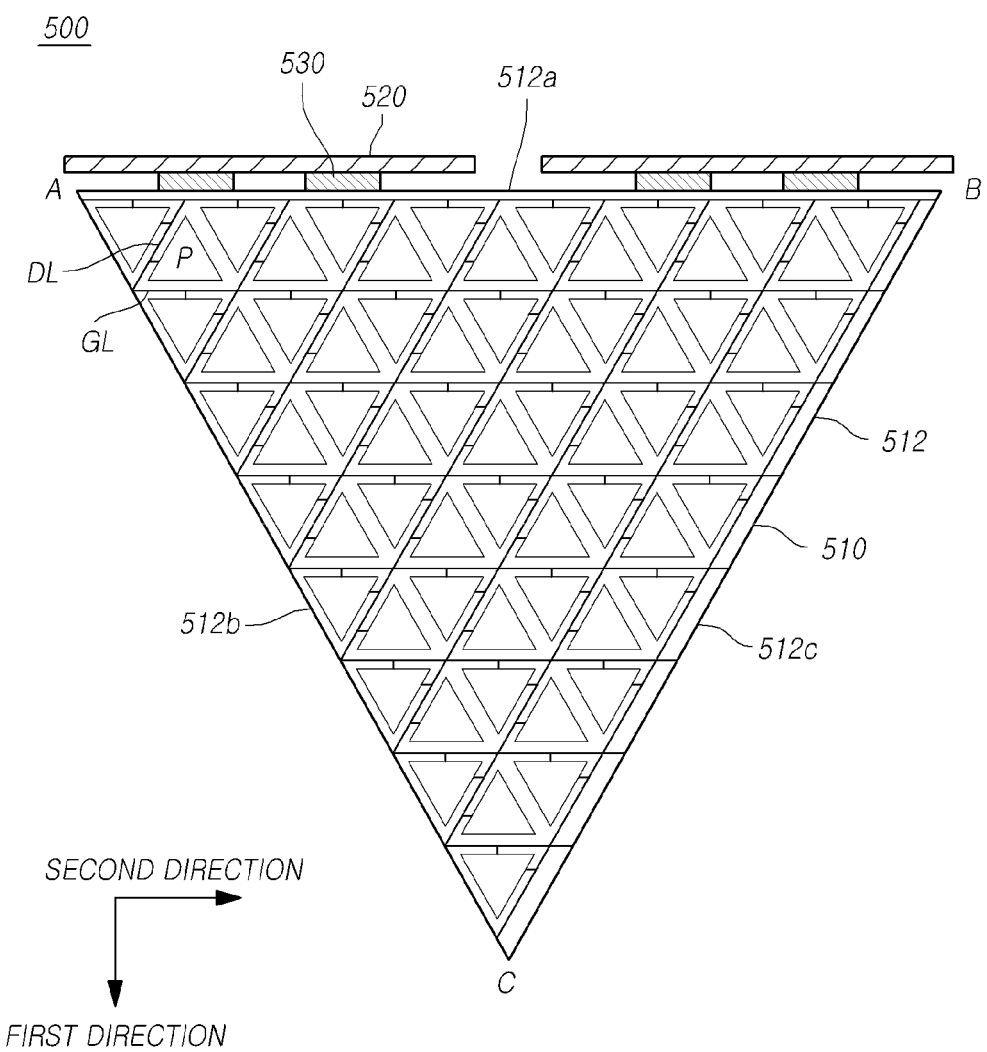
FIGS. 10 and 11 are plan views of a display device according to yet another embodiment.
Figure 11:
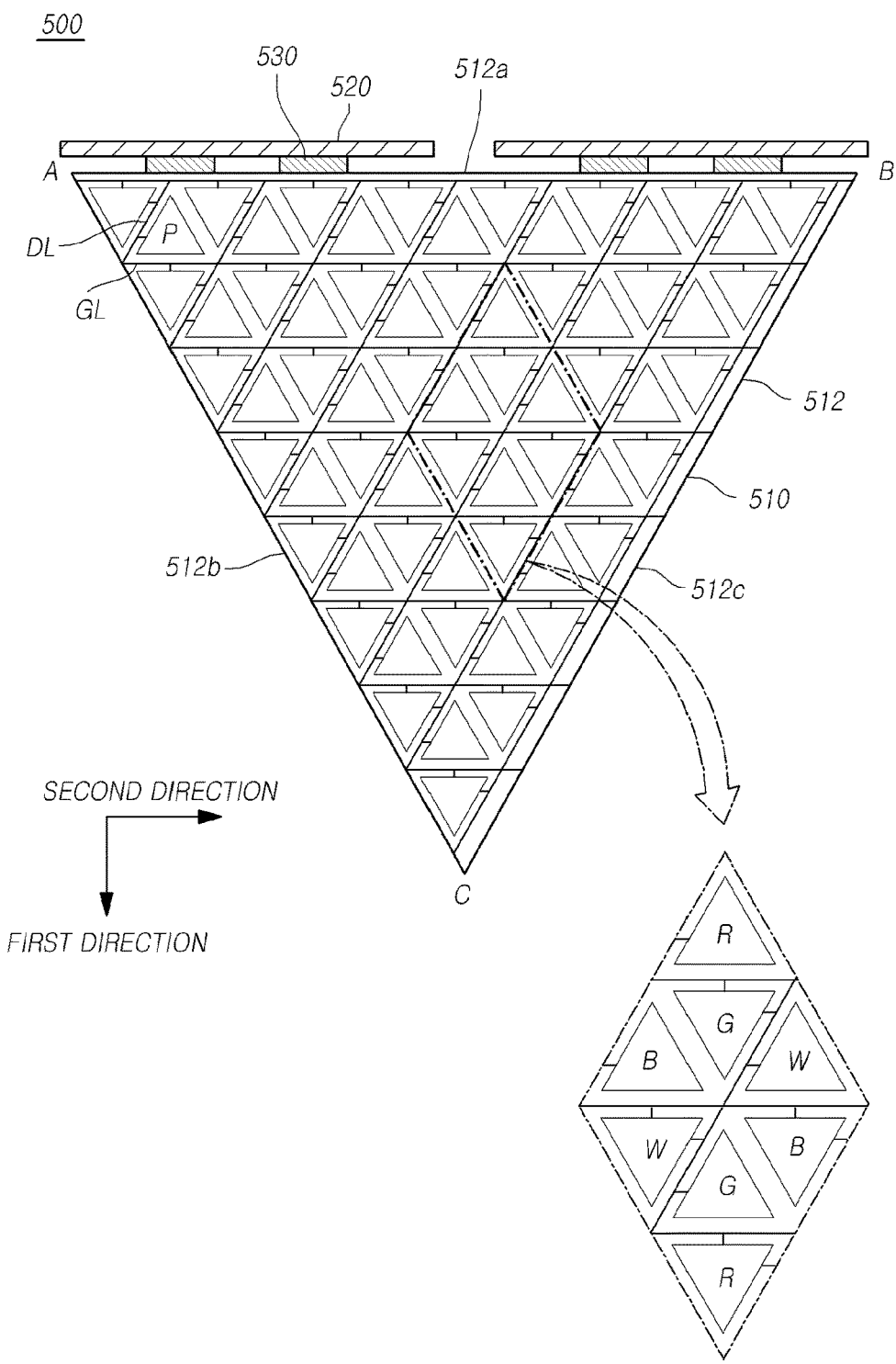

FIGS. 10 and 11 are plan views of a display device according to yet another embodiment.

Referring to FIG. 10, the display device 500, according to this embodiment, may include a display panel 510, a driver 520, and a connector 530. Multiple pixels P disposed in the areas of the display panel 510 where data lines DL and gate lines GL cross each other may have a triangular shape.

Two triangular pixels adjacent to each other in a second direction may be arranged in opposite directions to form a parallelogram as a whole. Accordingly, a step pattern is not recognized at the boundary between an active area and a non-active area.

The data lines DL may be arranged so as to be inclined with respect to a first direction, and the gate lines GL may be arranged parallel to the second direction.

The triangular shape of the multiple pixels P may be similar to that of a substrate 412, but is not limited thereto. For example, if the substrate 412 has the shape of an equilateral triangle, the multiple pixels P may also have the shape of an equilateral triangle.

As illustrated in FIG. 11, three pixels P arranged in the second direction and one pixel P adjacent thereto in the first direction may be repetitively disposed in a triangular shape. In this case, the four pixels repetitively disposed in a triangular shape may include red (R), blue (B), green (G), and white (W) pixels. The red (R), blue (B), green (G), and white (W) pixels may represent one color.

Figure 12:
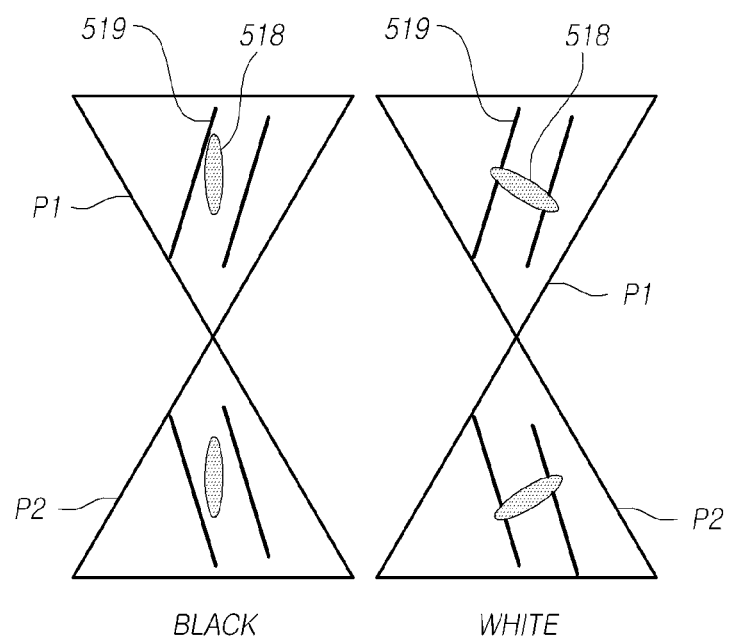
FIG. 12 illustrates alignment layers of pixels included in a liquid crystal display device and the directions of liquid crystals when the liquid crystals are driven in a case where the display device of FIG. 10 is a liquid crystal display device according to one embodiment.

FIG. 12 illustrates alignment layers of pixels P1 and P2 included in a liquid crystal display device and the directions of liquid crystals when the liquid crystals are driven in a case where the display device of FIG. 10 is a liquid crystal display device.

Referring to FIG. 12, in a case where the display device of FIG. 10 is a liquid crystal display device, and the two pixels P1 and P2 adjacent to each other in the second direction are liquid crystal cells, the directions of the alignment layers 519 of the two adjacent liquid crystal cells P1 and P2 may differ from each other. Accordingly, the liquid crystals 518, when being driven, may rotate in different directions so that the two liquid crystal cells P1 and P2 may operate as different domains.

Figure 13:
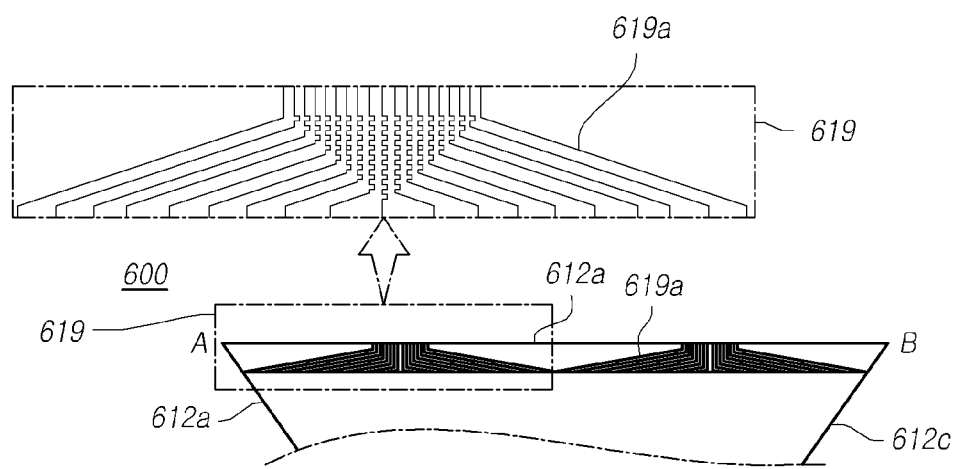
FIG. 13 is a plan view illustrating a part of a display panel in a display device according to yet another embodiment.

FIG. 13 is a plan view illustrating a part of a display panel in a display device according to yet another embodiment.

Referring to FIG. 13, the display device 600, according to this embodiment, may further include: a data pad unit (not illustrated) that includes multiple data pads disposed in the non-active area N/A directed toward a first side 612a of a substrate 612; and a data link line unit 619 that includes multiple data link lines 619a that connect the data pad unit and data lines DL. The multiple data link lines 619a included in the data link line unit 619 may have the same length.

Among the multiple data link lines 619a included in the data link line unit 619, data link lines 619a located on the central portion may each have a part disposed in zigzags in the non-active area N/A of the display panel 610. Accordingly, the lengths of the data link lines 619a from the data pads (not illustrated) to the data lines DL may be equal to each other on the central portion and the outer peripheral portions.

However, since the lengths of the multiple data lines DL disposed on the triangular substrate 612 gradually decrease from the central portion to the outer peripheral portions, the total length of the data lines DL and the data link lines 619a on the central portion may be shorter than that of the data lines DL and the data link lines 619a on the outer peripheral portions. Accordingly, the line resistance of the data lines DL located on the central portion may be greater than that of the data lines DL located on the outer peripheral portions.

Figure 14:
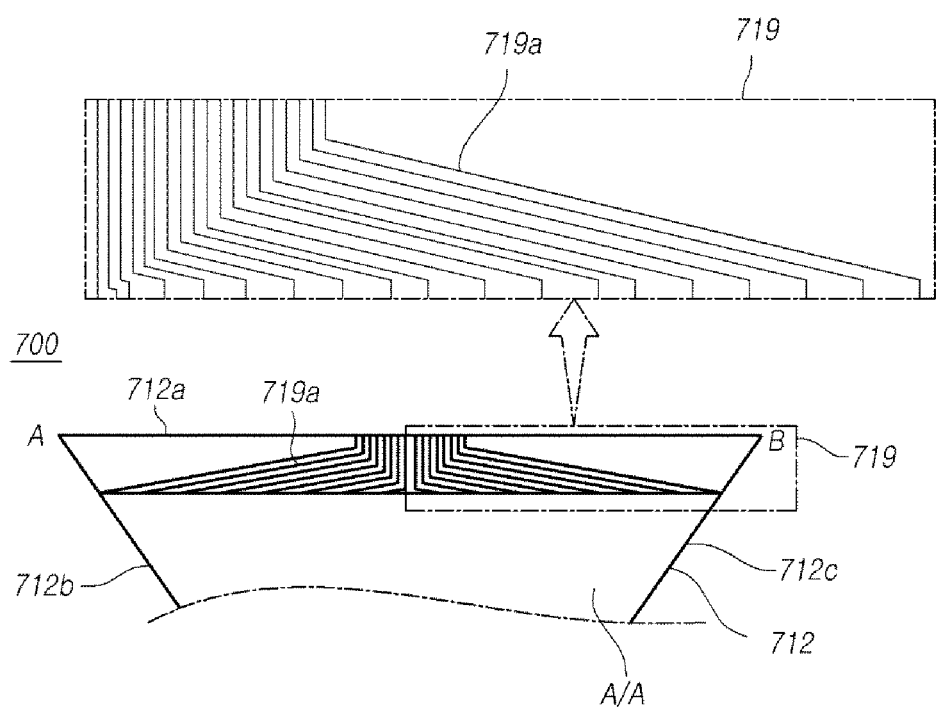
FIG. 14 is a plan view illustrating a part of a display panel in a display device according to yet another embodiment.

FIG. 14 is a plan view illustrating a part of a display panel in a display device according to yet another embodiment.

Referring to FIG. 14, the display device (700), according to this embodiment, may further include: a data pad unit (not illustrated) that includes multiple data pads disposed in the non-active area N/A directed toward a first side 712a of a substrate 712; and a data link line unit 719 that includes multiple data link lines 719a that connect the data pad unit and data lines DL. The lengths of the multiple data link lines 719a included in the data link line unit 719 may gradually decrease and then increase from one end A to the other end B of the first side 712a of the substrate 712. In other words, the lengths of the multiple data link lines 719a on the peripheral portions may be greater than those of the multiple data link lines 719a on the central portion.

Since the lengths of the multiple data lines DL disposed on the triangular substrate 712 gradually increase from the central portion to the outer peripheral portions, the total length of the data lines DL and the data link lines 719a may be constant. Accordingly, the line resistance of the data lines DL located on the central portion and the outer peripheral portions may be constant in the active area A/A.

A multi-display device may be manufactured by combining two or more of the display devices according to the embodiments mentioned above.

In addition, the multi-display devices, according to the embodiments of the present invention, may continuously display one image in three dimensions.

Although the display devices and the multi-display devices, according to the embodiments of the present invention, have been described with reference to the accompanying drawings, the present invention is not limited thereto.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A display device comprising:
   a triangular display panel including:
      a triangular substrate;
      a plurality of data lines on the triangular substrate;
      a plurality of gate lines on the triangular substrate;
      a plurality of pixels disposed in a plurality of rows on the triangular substrate;
      a data driver located along a first side of the triangular substrate, the data driver supplying data voltages to the plurality of data lines; and
      a gate driver located along a second side or a third side of the triangular substrate that is distinct from the first side of the triangular substrate, the gate driver sequentially supplying gate signals to the plurality of gate lines,
      wherein the gate driver comprises a plurality of gate-in-panels, and the plurality of gate-in-panels are disposed at the second side or the third side of the triangular substrate, and the plurality of gate-in-panels are aligned with the second side or the third side of the triangular substrate,
      wherein a number of pixels in each of the plurality of rows decreases as a distance between each row and the first side of the triangular substrate increases.

2. The display device of claim 1, wherein the plurality of data lines are arranged in a first direction from the first side of the triangular substrate, and lengths of the plurality of data lines increase from a first end of the first side of the triangular substrate toward a center of the first side of the triangular substrate, and the lengths of the plurality of data lines decrease from the center of the first side of the triangular substrate towards a second end of the first side of the triangular substrate,
   wherein the plurality of gate lines are arranged between the second side and the third side of the triangular substrate in a second direction intersecting the first direction, and lengths of the plurality of gate lines decrease as a distance from each gate line to the first side of the triangular substrate increases.

3. The display device of claim 1, wherein when the plurality of gate-in-panels each comprising a height of a, and the triangular substrate comprising a shape of an equilateral triangle, the plurality of gate-in-panels obliquely arranged in a direction from a first end of either the second side or the third side of the triangular substrate to a second end of either the second side or third side of the triangular substrate with a pitch of a/b (a and b are real numbers greater than 0) inward from either the second side or third side of the triangular substrate.

4. The display device of claim 2, wherein two or more pixels from the plurality of pixels that are located at an edge of a second side of the triangular substrate are obliquely arranged at the edge of the second side of the triangular substrate,
wherein two or more pixels from the plurality of pixels that are located at an edge of a third side of the triangular substrate are obliquely arranged at the edge of the third side of the triangular substrate, and
the display device further comprises a black matrix that obliquely covers a part of each of the two pixels located at the edge of the second side of the triangular substrate and the black matrix obliquely covers a part of each of the two pixels located at the edge of the third side of the triangular substrate.

5. The display device of claim 4, wherein an angle of inclined lines of the black matrix is smaller than or equal to 63.4 degrees with respect to the first side of the triangular substrate.

6. The display device of claim 4, wherein inclined lines of the black matrix are parallel to directions defined by vertices at corners of one or more pixels located at the edges of the second side and the third side of the triangular substrate.

7. The display device of claim 6, wherein the inclined lines of the black matrix pass through the vertices at the corners of the one or more pixels located at the edges of the second side and the third side of the triangular substrate.

8. The display device of claim 7, wherein when the triangular substrate has a shape of an equilateral triangle, a ratio of a length in the second direction and a length in the first direction is 1: $\sqrt{3}/n$ for each of the pixels located at the edge of the second side and the third side of the triangular substrate (n is a minimum number of pixels located at the edges of the second side and the third side of the triangular substrate that include vertices of which the inclined line of the black matrix passes through).

9. The display device of claim 1, wherein two or more pixels from the plurality of pixels that are located at an edge of a second side of the substrate are obliquely arranged at the second side of the triangular substrate,
wherein two or more pixels from the plurality of pixels that are located at an edge of a third side of the triangular substrate are obliquely arranged at the edge of the third side of the triangular substrate, and
wherein a luminance of the two or more pixels located at the edges of the second side and the third side of the triangular substrate are lower than a luminance of pixels located at a central portion of the substrate.

10. The display device of claim 9, wherein the luminance of the pixels located at the edges of the second side and the third side of the triangular substrate gradually decreases towards the edge of the second side and the third side of the triangular substrate.

11. The display device of claim 2, wherein each of the plurality of pixels has a triangular shape, and two adjacent pixels in the second direction form a parallelogram.

12. The display device of claim 11, wherein the triangular shape of the plurality of pixels is similar to a shape of the triangular substrate.

13. The display device of claim 11, where three pixels arranged in the second direction and one pixel adjacent to the three pixels in the first direction are repetitively disposed in a triangular shape.

14. The display device of claim 13, wherein the four pixels repetitively disposed in the triangular shape comprise a red pixel, a blue pixel, a green pixel, and a white pixel.

15. The display device of claim 11, wherein when to the two adjacent pixels being liquid crystal cells, a direction of alignment layers of the two adjacent pixels are different from each other.

16. The display device of claim 2, wherein the display panel further comprises:
a data pad unit that comprises a plurality of data pads is in a non-active area of the display panel that does not display an image, the data pad unit located at the first side of the triangular substrate; and
a data link line unit that comprises a plurality of data link lines, the plurality of data link lines connecting together the data pad unit and the plurality of data lines, and
wherein lengths of the plurality of data link lines decrease from the first end of the first side of the triangular substrate toward the center of the first side of the triangular substrate, and the lengths of the plurality of data link lines increase from the center of the first side of the triangular substrate towards the second end of the first side of the triangular substrate.

17. The display device of claim 1, wherein a row of pixels closest to the first side of the triangular substrate includes the most amount of complete pixels in the display device.

18. A multi-display device with four or more surfaces and the multi-display device including a plurality of display devices assembled together through a connecting member to form the multi-display device, wherein each display device comprises:
a triangular display panel including:
a triangular substrate;
a plurality of data lines on the triangular substrate;
a plurality of gate lines on the triangular substrate;
a plurality of pixels disposed in a plurality of rows on the triangular substrate, the plurality of pixels arranged in a shape of a triangle on the triangular substrate;
a data driver located along a first side of the triangular substrate, the data driver supplying data voltages to the plurality of data lines; and
a gate driver located along a second side or a third side of the triangular substrate that is distinct from the first side of the triangular substrate, the gate driver sequentially supplying gate signals to the plurality of gate lines,
wherein the gate driver comprises a plurality of gate-in-panels, and the plurality of gate-in-panels are disposed at the second side or the third side of the triangular substrate, and the plurality of gate-in-panels are aligned with the second side or the third side of the triangular substrate,
wherein a number of pixels in each of the plurality of rows decreases as a distance between each row and the first side of the triangular substrate increases.

19. The multi-display device of claim 18, wherein the multi-display device has one of a polyhedral shape, a spherical shape, or a hemispherical shape.

* * * * *